Sept. 9, 1930.  E. N. BALDWIN  1,775,582
ELECTRIC BRAKE
Filed Oct. 27, 1928
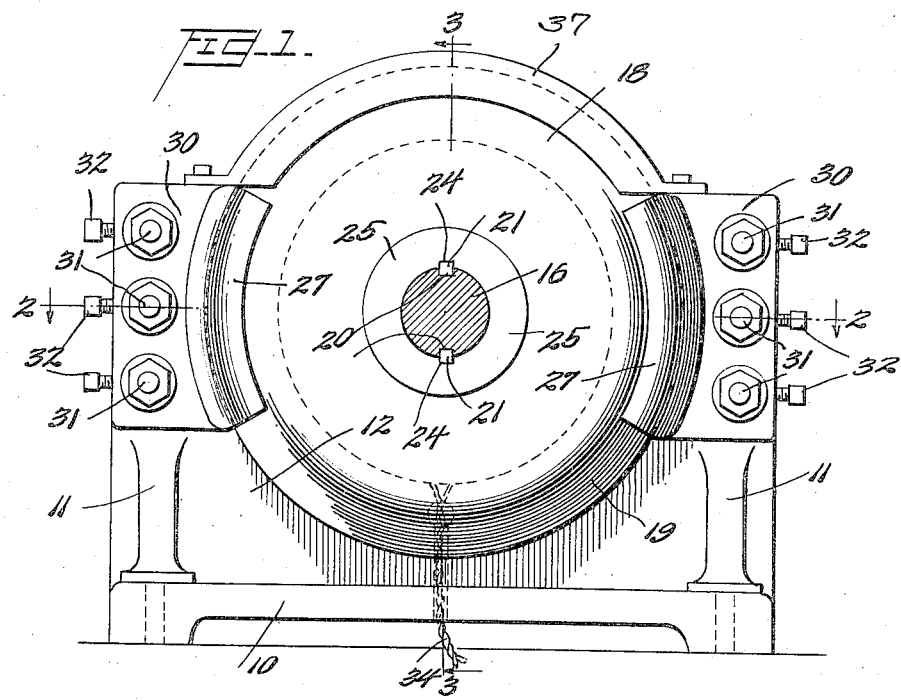
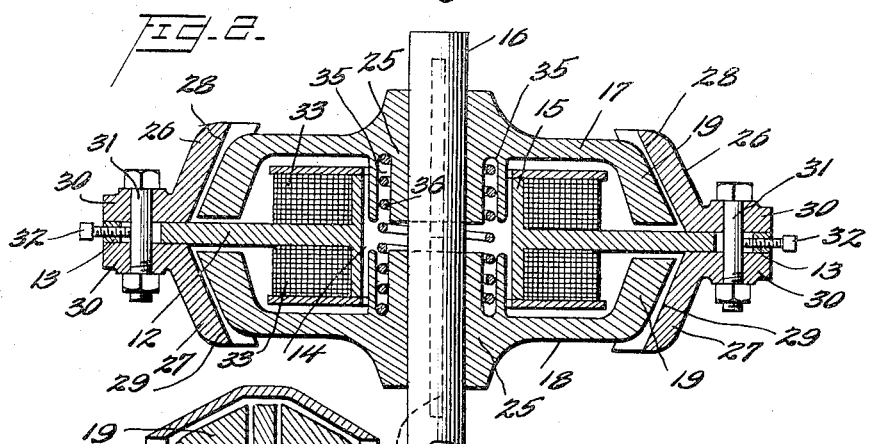
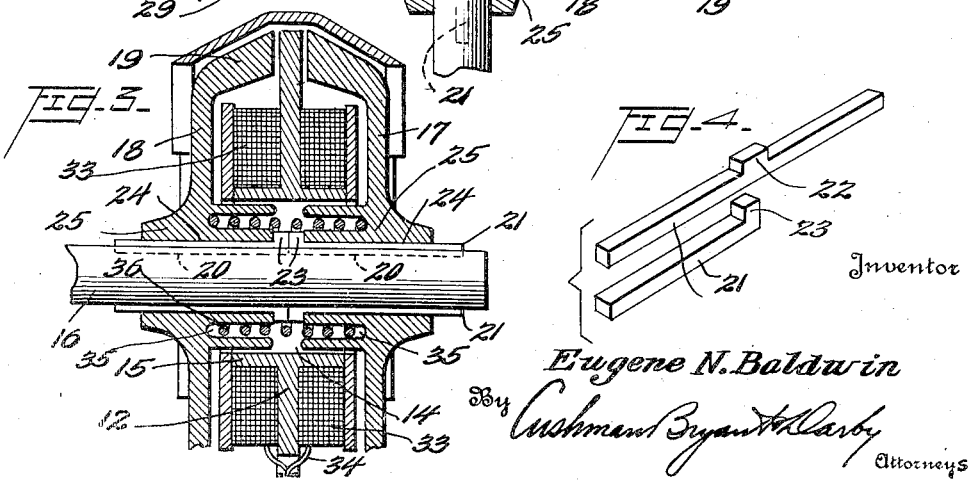
Inventor
Eugene N. Baldwin
By Cushman Byrant & Darby
Attorneys Patented Sept. 9, 1930

1,775,582

UNITED STATES PATENT OFFICE

EUGENE N. BALDWIN, OF DONORA, PENNSYLVANIA

ELECTRIC BRAKE

Application filed October 27, 1928. Serial No. 315,580.

This invention relates to an electric brake adapted for many useful purposes, but particularly devised for use on electric overhead traveling cranes.

An object of the invention is to provide a very simple construction wherein all of the parts are concealed and wherein should it become necessary after long usage to provide replacements, such repairs can be made with facility not now possible with conventional structures.

It is of primary importance that brakes of this character which are carried by the motor shaft should act simultaneously with the cutting off of the current and it is an object of the invention to provide such a construction wherein the brake will act only when the current supplied to the lifting, cross traveling or longitudinally traveling motor is for any reason cut off.

The brake is designed to operate automatically when the current is shut off and a very novel construction is employed for limiting the movement of the friction members out of braking position.

Referring to the drawings:

Figure 1 is a side elevation.

Figure 2 is a section on the line 2—2 of Figure 1.

Figure 3 is a section on the line 3—3 of Figure 1, and

Figure 4 is a detail view showing two types of keys.

Referring to Figure 1, a base or bracket, indicated at 10, is provided with upstanding legs 11. These legs are adapted to support in any suitable manner a fixed member 12. This member 12 is provided with wings 13 extending laterally whereby the said fixed member may be connected to or supported by the legs. In other words, this fixed member by reason of the wings 13 may be made integral with the legs 11 or secured thereto in any desired manner, preferably affording some means of adjustment.

The member 12 intermediate the wings, may be circular or simply a straight bar provided with a central opening 14. This opening 14 may be defined by a hub 15 integral with the central member and the purpose of which will presently be described. A shaft 16 which may be the motor shaft, or a shaft connected to the motor shaft, extends through the opening 14 and carries the rotary friction members. These members 17 and 18 are arranged upon opposite sides of the central fixed member 12 and are preferably circular, their peripheries being formed as inwardly directed inclined flanges 19.

The shaft 16 is provided in its periphery with spaced longitudinally extending recesses 20. Fitted within the recesses are suitable keys indicated in Figure 4 as a whole at 21. These keys may take the form of an integral member provided with an intermediate enlargement 22, or the form of separate members which when assembled as in Figure 3, have their enlargements 23 abutting. It will be understood that there may be any number of keys employed, spaced about the periphery of the shaft.

The projecting side of the keys is adapted to be received within the recesses 24 formed in the hubs 25 of the rotary friction members, these recesses being longitudinally extending and being complementary to the recesses in the shaft.

The rotary friction members, it will be understood since they are keyed to the shaft, will rotate therewith, but by reason of their keyed engagement, are slidable upon the shaft and are guided in their sliding movement by the keys. It will be clear at this time also that the intermediate enlargement 22 of an integral key, or the abutting enlargements 23 of separate keys will provide a stop limiting the inward movement of the rotary friction members.

The members 17 and 18 constitute the movable friction members of the brake and they are adapted to engage a fixed friction surface which will now be described.

The wings 21 are suitably slotted, and secured to opposite sides of said wings are arcuate members 26 and 27. These members, it will be noted, are provided with the inclined portions, the inner portion surfaces 28 and 29 of which are complementary to the flanges of the rotary friction members. The members 26 and 27 are provided with straight base portions 30 having openings therein, and the wings 13 are provided with spaced slotted openings whereby through the medium of the bolts 31 and the set screws 32, the fixed friction surface may be adjusted both laterally and vertically.

There is carried by the central fixed member 12, preferably adjacent the hub 15, solenoid windings indicated at 33. These may be connected to the fixed member in any suitable manner. Electrical connections 34 for the solenoids are shown in Figure 1. When the solenoids are energized, they serve to draw the rotatable friction members inwardly and this is possible by reason of the sliding engagement of the said members with the shaft. This inward movement is limited by the engagement of the hubs 25 with intermediate enlargements 22 or 23 so that the rotary sliding friction members cannot at any time engage the central fixed member.

It will be observed that the rotary members, as shown, for instance, in Figure 2, provide a recess in which the solenoids are housed, and, moreover, there is formed in the hubs 25 of the said members recesses 35, which when the rotary friction members are in position are complemental, as best shown in Figures 2 and 3. These recesses 35 are adapted to receive springs 36 which act to force the friction members outwardly into braking engagement with the friction surfaces 28 and 29.

The operation of the invention, will, therefore, be clear, it being understood that when the current is turned on, the solenoids withdraw the friction members inwardly out of braking engagement and the inward movement is limited by the intermediate stops 22 or 23.

When the current is cut off, however, the springs 36 become immediately active and at once throw the friction members outwardly so that they are in engagement with the fixed friction members 26 and 27 and the shaft is effectively braked.

It will be noticed that by reason of the simplicity of the invention and of the construction, that the wear is well distributed over the various parts so that the brake mechanism will be very durable as well as dependable.

Mounted above the brake structure is a guard or weather cap 37 which is attached in any suitable manner to the fixed member 12.

It will be understood that the recesses 35 in the hubs 25 of the rotary members are semi-circular so that when the rotary members are in assembled relation, substantially circular recesses are provided to receive a coil spring indicated at 36. The purpose of this spring has been already referred to.

The solenoid windings may be carried by the central member 12 in any desired manner, and it will be seen that the hubs of the rotary members project within the opening formed centrally of the fixed member 12.

It will also be observed upon reference to Figure 3 that the coil springs surround the shaft and keys, but are spaced by reason of the recess wall from the solenoids and the said keys.

Various modifications may be worked out from the present disclosure, all of which are considered to be covered by the appended claims.

I have illustrated in the drawings the use of independent and separate keys, and it will be understood that this is the preferred embodiment, but it will likewise be clear that in many instances a single integral key will be quite satisfactory.

It will also be understood that the legs 11 may be integral with the base or bolted thereto and that the base 10 may be provided with suitable bolt holes to receive bolts or other securing means to attach it to the trolley or other frame and whereby the base may be adjusted with respect to said frame.

What I claim is:

1. In a brake mechanism, a conical friction surface, a rotatable shaft, a friction member slidably carried by said shaft and having a conical portion adapted to engage said friction surface, a solenoid for actuating said friction member to unbraking position, and means projecting from the shaft for limiting movement of said member when acted upon by said solenoid.

2. In a brake mechanism, a conical friction surface, a rotatable shaft, a friction member slidably carried by said shaft and having a conical portion adapted to engage said friction surface, a solenoid for actuating said friction member to unbraking position, means for limiting movement of said member when acted upon by said solenoid comprising a projection on the shaft, and means for forcing said member into engagement with said friction surface when the action of the solenoid ceases.

3. In a brake mechanism, a fixed friction surface, a rotatable shaft, a key carried by said shaft, a friction member engaging said key, a solenoid for actuating said friction member to move the same on said key and shaft to unbraking position, and a stop carried by said key for limiting the movement of said member when actuated by said solenoid.

4. In a brake mechanism, a fixed friction surface, a rotatable shaft, a key carried by said shaft, a friction member engaging said key, a solenoid for actuating said friction member to move the same on said key and shaft to unbraking position, a stop carried by said key for limiting the movement of said member when actuated by said solenoid, and means for forcing said member into engagement with said friction surface when the action of the solenoid ceases.

5. A brake mechanism comprising a fixed member, a conical friction surface carried thereby, a shaft extending through said member, a solenoid carried by said member, a rotary friction member having a conical portion keyed to said shaft and slidable thereon, said friction member being movable in one direction under the action of said solenoid, and a spring carried by the rotary member for moving it in the opposite direction when the action of the solenoid ceases whereupon the friction member will engage the friction surface.

6. In a brake mechanism, a fixed member having an opening therein, a friction surface supported by said fixed member, a shaft passing through the opening in said member a solenoid carried by said fixed member, said rotary member being slidable upon the shaft in one direction under the action of said solenoid, means projecting from the shaft for limiting the movement of the rotary member when acted upon by the solenoid, and a spring carried by the rotary member for moving it into frictional engagement with the fixed friction member when the action of the solenoid is cut off.

7. In a brake mechanism, a fixed member carrying a friction surface and having an opening therein, a shaft passing through said opening, a key carried by said shaft and having an enlarged stop, a rotary friction member engaging said key and slidable thereon, a solenoid carried by said fixed member adapted to withdraw the rotary member to unbraking position, the said rotary member being limited in its movement under the action of the solenoid by said stop, the said rotary member having a recess adjacent its hub portion and a spring carried in said recess for moving the rotary friction member to braking position in engagement with said fixed friction surface.

8. In a brake mechanism a fixed member carrying a friction surface, said member having an opening therein, a shaft extending through said opening, a key mounted in the shaft, rotary friction members keyed to said shaft by said key and arranged upon opposite sides of said fixed member, said rotary members being slidable upon said key and shaft, and the said key being provided with an intermediate stop portion, solenoids carried by said fixed member and adapted to move said rotary members to unbraking position, aligned recesses formed in said friction members, and a spring arranged in said recesses and adapted when the solenoid is deenergized to move the friction members into engagement with the friction surface.

9. In a brake mechanism, a fixed member carrying a conical friction surface, said member having an opening therein, a shaft extending through said opening, a key mounted in the shaft, rotary friction members having conical friction surfaces keyed to said shaft by said key and arranged upon opposite sides of said fixed member, said rotary members being slidable upon said key and shaft, and the said key being provided with an intermediate stop portion, solenoids carried by said fixed member and adapted to move said rotary members to unbraking position, aligned recesses formed in said friction members and a spring arranged in said recesses and adapted when the solenoids are deenergized to move the friction members and cause braking engagement of the conical friction surfaces of the respective members.

10. In a brake mechanism, a conical friction surface, a rotatable shaft, a friction member having a conical portion slidably carried by said shaft with its conical portion adapted to engage said conical friction surface, a solenoid for actuating said friction member to unbraking position and means for limiting movement of said member when acted upon by said solenoid.

11. In a brake mechanism, a fixed member, conical braking surfaces secured thereto, a shaft passing through said member, movable friction members carried by said shaft upon opposite sides of said fixed member, a spring carried by said movable members to urge them towards the conical braking surfaces, and solenoids carried by the fixed member to move the movable members to unbraking position.

12. In a brake mechanism, a fixed member, conical friction surfaces secured thereto, a shaft extending through said fixed member, movable members carried by said shaft and having conical friction surfaces, a spring carried by said movable members to urge them to braking position with the respective friction surfaces in engagement, and solenoids carried by said fixed member for moving said movable members from braking position.

13. In a brake mechanism, a fixed member, a friction surface carried thereby and located upon opposite sides of the fixed member, a shaft extending through said fixed member, movable members mounted upon said shaft upon opposite sides of said fixed member, said movable members having recesses, means for urging said movable members into braking engagement with said friction surface and solenoids carried by said fixed member and disposed in said recesses.

In testimony whereof I have hereunto set my hand.

EUGENE N. BALDWIN.